March 2, 1971     T. A. SHANKOFF     3,567,444

HOLOGRAPHIC RECORDING METHOD

Filed Oct. 20, 1967     2 Sheets-Sheet 1

INVENTOR
T. A. SHANKOFF
BY
George S. Indy
ATTORNEY 3,567,444
HOLOGRAPHIC RECORDING METHOD
Theodore A. Shankoff, North Plainfield, N.J., assignor to Bell Telephone Laboratories, Incorporated, Murray Hill and Berkeley Heights, N.J.
Filed Oct. 20, 1967, Ser. No. 676,866
Int. Cl. G03c 5/00, 5/04
U.S. Cl. 96—27                                      7 Claims

ABSTRACT OF THE DISCLOSURE

This disclosure relates to a holographic recording method which uses a sensitized gelatin film as the recording medium, and which employs a critical film-development step in processing.

---

This invention relates to a holographic recording method that uses sensitized gelatin as a recording medium, and, in particular, to the making of inexpensive, highly efficient diffraction gratings by holography.

FIELD OF THE INVENTION

The invention is of general importance to the field of holography as it presents a new holographic recording medium; and, inasmuch as the invention can be employed in the making of high quality diffraction gratings at very low cost, it also pertains to apparatus and techniques which use them.

BACKGROUND OF THE INVENTION

It is commonplace to find holograms made in recording media of photographic emulsions. The photographic plate, on which the hologram is to be recorded, has its emulsion exposed by interfering incident laser beams, one representing, perhaps, an information beam and the other a reference beam. As is the case with ordinary photography, the exposed emulsion is developed and fixed to yield a medium having a nonuniform density of light-absorbing silver particles, the nonuniformity being related, of course, to the variation in light intensity of the object of interest. In holography, then, as in common photography, reconstruction depends upon the ability of the developed emulsion medium to absorb the light used to "read" the recorded information and hence the process is inherently a lossy one.

Unlike ordinary photography, however, holography does not record an image, but rather an extremely complex inferference pattern; indeed, the hologram is, in essence, a complicated diffraction pattern. This in turn suggests that holographically-produced diffraction gratings can be made to replace the very costly mechanically-produced ones which now find commercial acceptance. Unfortunately, due to their loosy nature, holographically-produced gratings in photographic emulsion media are not very efficient; moreover, the grain structure of a photographic emulsion is an inherent limiting factor of resolution and quality of diffraction.

It is known in general that a variation of the refractive index of a transmitting recording medium, rather than variation of opacity, would result in desired diffraction with lower losses. However, any particular medium to be suited for such technique must meet many criteria, among which are lack of distortion during processing, permanence and resolution power. The invention of this application meets these, and other, criteria.

SUMMARY OF THE INVENTION

In accordance with the present invention a method has been found for making relatively nonlossy holograms by using a sensitized gelatin recording medium that must be critically developed after exposure. When properly developed, the medium suffers no significant distortion, has an indefinite shelf-life and can, depending on the degree to which the light for exposure has been modulated, offer exceedingly high resolution per unit dimension.

In particular, the method contemplates the exposure of water soluble, sensitized gelatin thin films to result in selective insolubilization of the gelatin; followed by dissolving-out the unexposed and hence still soluble portions of gelatin in water; in turn followed by a very critical fixing step wherein any remaining water from the previous step is quickly removed, as, for instance, by absorption into a nongelatin-dissolving drying agent before the gelatin can become substantially air-dried.

With this method, diffraction gratings can be made with high efficiencies upwards of 95 percent of the theoretical maximum, as explained hereinafter, as well as with periodicities from 50,000 to 100,000 lines per inch with ease.

The invention will be further described and particularized in the following detailed description in conjunction with the accompanying drawing in which.

DETAILED DESCRIPTION

Basically, the recording medium is an aqueous gelatin system that is sensitized with a pyridine-oxychromium compound, although other sensitizers can be employed. The class of sensitizers of pyridine-dichromate and pyridine-chromium trioxide is known and is designated PDC herein. Experiments reported herein typically used the yellow-orange reaction product which crystallized when a saturated aqueous solution of 5 ml. pyridine and 7 gm. $CrO_3$ were added to excess acetone at $-10$ degrees centigrade.

Since the function of the PDC is to sensitize the system to light and insolubilize the gelatin, too little PDC will not produce an adequate and speedy response; greater concentrations progressively increase the sensitivity of the system and amounts of PDC up to its solubility limit in the aqueous gelatin are acceptable. In terms of the weight ratio of PDC to gelatin, these limits are 0.1 and 0.6 respectively.

Figure 1:
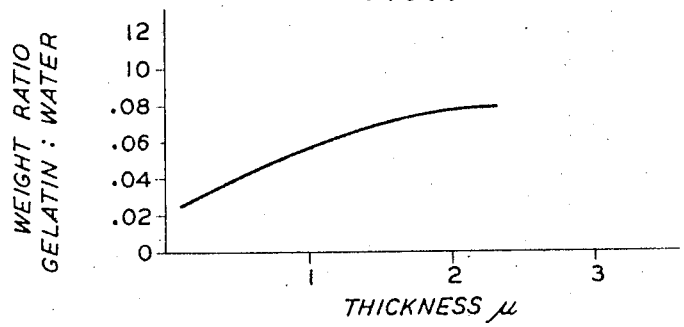
FIG. 1 is a graph of gelatin to water weight ratios versus film thickness ($\mu$)

To be usable in the holographic process to be described, the aqueous PDC-gelatin solution is placed in film form on an appropriate substrate, for example glass. The amount of water in the solution is dependent on the desired film thickness. If films are prepared by a dip coating technique, the weight ratio of gelatin to water for films of less than $2\mu$ ranges from .02 to .08, at 0.17 inch per second dip rate. These data are presented in FIG. 1. Other film-forming techniques can be used too with modified weight ratios if desirable, and gelatin in amounts up to its solubility limit in water is acceptable.

The PDC-gelatin films exhibit a substantial dark reaction; consequently, they should be used soon after preparation for preferred results.

Figure 2:
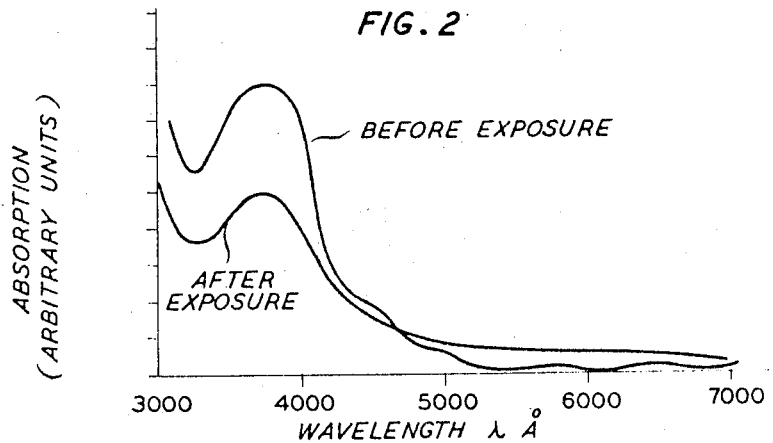
FIG. 2 is a graph of the percent absorption of the dichromated gelatin films before and after exposure and development versus wavelength of incident light (A.)

In order for a laser beam to "write" or record in any holographic medium, there must be sufficient absorption of the light to effect the basic change that indicates whether light did or did not impinge at a particular location. The approximate absorptivity of the PDC-gelatin films, both before and after development, is shown in FIG. 2, where it is seen that writing at about 3800 A. is most efficient within the 3000 to 7000 A. range tested. Experiments reported herein were carried out with an argon laser whose output was at 4880 A. It is apparent from FIG. 2 that the most efficient wavelengths at which to "read" are found in the range where absorption of the developed film is minimal, for example at 6328 A. which corresponds to the output of a helium-neon laser.

After exposure, the PDC-gelatin film has become water-insolubilized at those locations where sufficient exposure has occurred. Development of the film preferably should proceed without delay after exposure to minimize the effect of the dark reaction.

Development entails washing out the still-soluble portions of the gelatin film in somewhat warmed water, thus leaving behind a pattern formed from the insolubilized residuum of gelatin, bonded water, sensitizer and its reaction end-products. Since the technique is capable of recording spacings of 2600 A. and even less, swelling or shrinking of the gelatin pattern or development must be minimized. High water temperature and long development times consequently are to be avoided, and preferably development is carried out at less than 40° C. and under two minutes. Cold water has the disadvantage of requiring longer development times since the gelatin is less soluble in it; consequently temperatures above 15° C. are preferred. Optimum conditions are about 30 to 35° C. water temperature for 30 seconds.

After its removal from the water the gelatin pattern which remains is, of course, wet. It is most crucial to the success of the method under discussion that this excess moisture be removed quickly and preferably before the film can substantially dry-out. Failure to do so prevents fixing of the pattern as brought out by development. Allowing the film simply to dry in the ambient does not result in proper fixation, nor does rapid air drying. However, if, before it dries, the film is washed in a water-absorbing solvent that is not harmful to the gelatin pattern and is itself sufficiently volatile to be self-removing, excellent fixation with minimal distortion is achieved. Solvents such as absolute ethanol and absolute propanol are just two examples. A further cautionary step should be noted, however, since ambient moisture can condense on the pattern as a result of its being cooled by the evaporation of solvent. This is easily avoided by conducting such evaporation generally under conditions which are above the dew-point of the ambient.

Despite the criticality of the drying steps noted, once development and drying are completed the hologram produced is stable and optically fixed in all but conditions approaching 100 percent humidity.

Gratings produced in the manner of the invention have exhibited periodicities as high as 100,000 lines per inch. This equals the best mechanically produced gratings known, but at a cost which is significantly lower.

Of importance too is the fact that PDC-gelatin gratings have significantly better spectral resolving power (ability to separate spectral lines) than do photographic emulsion gratings. As is well known, spectral resolution is determined by the product $mN$, where $m$ is the diffracted order considered and $N$ the number of lines on the grating. With its large value of N, a PDC-gelatin grating has a spectral resolution of at least about 0.1 A.; by comparison photographic emulsion gratings can resolve lines separated by not less than about 2 A. For resolution that compares favorably to that of the above-described gratings, one must resort to specially blazed, engine-ruled gratings obtainable only at comparatively great cost.

Figure 3:
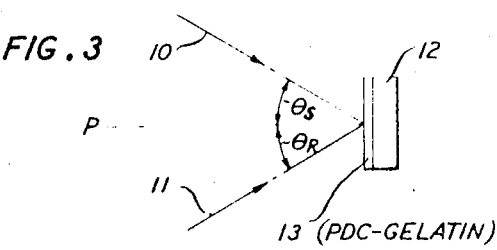
FIG. 3 is a diagrammatic representation of a method for holographically recording essentially unmodulated information.
Figure 4:
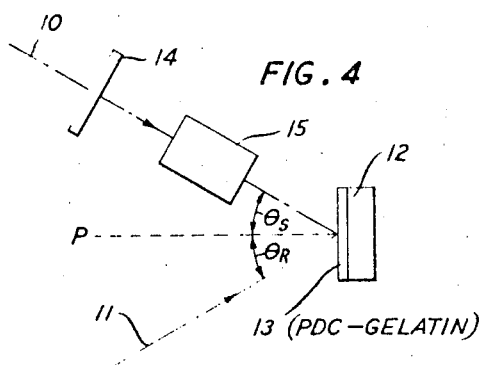
FIG. 4 is a diagrammatic representation of a method for holographically recording modulated information.

The making of the grating is straightforward, and is depicted in FIG. 3. Source beam 10 and reference beam 11 are directed at PDC-gelatin film 13 on substrate 12, the beams impinging at angles $\theta_S$ and $\theta_R$, respectively defined by the beam and the normal P to film 13. During exposure, the pattern that results from the interference between source beam 10 and reference beam 11 is recorded. In the case where both source beam 10 and reference beam 11 are essentially unmodulated, the interference pattern is uncomplicated and in the form of a simple diffraction grating pattern of alternating light and dark bands. A developed grating made in this manner is diagrammatically shown in FIG. 5, where a grating of thickness $t$ is shown with a grating spacing $d$. (Similar letters and numbers in the figures refer to the same features). Grating spacing $d$ is determined in accordance with the grating equation, $m\lambda = d(\sin\theta_S + \sin\theta_R)$; by way of example, $d = 2.8\mu$ at $\theta_S = \theta_R = 5°$ and $d = 0.46\mu$ when $$\theta_S = \theta_R = 32°$$

If it is desired to record modulated information, a diffusion screen 14 is placed before modulation means 15 in the well-known manner, thus allowing for modulation of source beam 10. Modulation means 15 may be, for example, an information-containing slide transparency, or a complex lens array. Of course, the complexity of the recorded interference pattern varies according to the extent of modulation; and, seemingly because of the nature of the etching process in requiring removal of material, too much modulation results in a developed film which is unable to faithfully record or reconstruct the information. The amount of modulation which should not be exceeded for any given purpose cannot be quantitatively set-forth, however its determination is a matter of only trivial experimentation.

Figure 6:
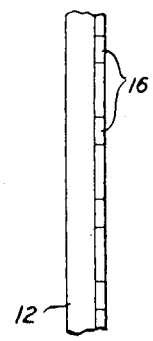
FIG. 6 is a diagrammatic representation of a side view of a portion of a transmittance grating.

The underlying principle of any diffraction grating is the interference of light. When interference is brought about by a periodic variation in the transmittance of the grating material, such as by alternating opaque and transparent bands, the grating is of the so-called spatial transmittance type. A transmittance grating is depicted in FIG. 6, which shows opaque material 16 on substrate 12.

Figure 7:
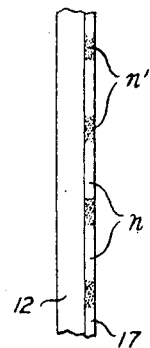
FIG. 7 is a diagrammatic representation of a side view of a portion of a phase grating.

In another case, interference is achieved not through variation in transmittance, but by a spatial variation in the index of refraction of the transmitting medium, which in turn effects a phase shift and hence interference. A phase shift grating is shown in FIG. 7 where grating material 17 on substrate 12 has a variation in its refractive index between values $n$ and $n'$, the material with the latter value represented by the dotted areas.

The effectiveness of a phase shifting grating depends upon the magnitude of the differences in the refractive indices at points throughout the material. Typically these differences cannot be made very great and are introduced by reliance on the direct change in refractive index that results from exposure. Theoretical treatment of phase gratings of this type has shown that the ratio $\eta$ between the diffracted intensity that contributes to the reconstruction of the original wavefront and the intensity of the reconstructing beam is a maximum of 0.339 for thin, two dimensional (2D) films and 1.0 for thick, three dimensional (3D) ones. (See Kogelnik, Proceedings of the Symposium of Modern Optics, Brooklyn Polytechnic Press, New York, 1967).

Figure 5:
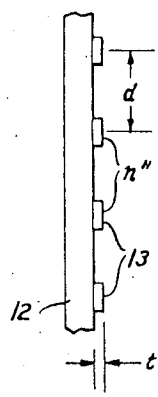
FIG. 5 is a diagrammatic representation of a side view of a portion of a grating of the invention.

In the described method, a greater difference in refractive index is achieved by etching-away portions of the film, thereby taking advantage of the refractive index of air. This is depicted in FIG. 5, where PDC-gelatin film 13 of refractive index $n''$ remains on substrate 12 as a residual pattern after development, which pattern allows for the influence of the refractive index of air on the extent of diffraction.

Films which approach the theoretical maximum $\eta$ for both the 2D and 3D cases have been made with the described technique. However, to achieve close to maximum $\eta$ with a given intensity source beam, a definite exposure time must be met. This is demonstrated in FIG. 8 for a 2D film, 0.5μ in thickness, exposed at an 0.8 milliwatt/cm.² intensity with an argon laser at $\theta_S=\theta_R=5°$, and a 3D film with corresponding values of 1.54μ, 1 milliwatt/cm.² and $\theta_S=\theta_R=32°$. The time to maximum $\eta$ as a function of film thickness for an argon laser employed at an intensity of from 0.8–1.0 milliwatt/cm.² is given in FIG. 9. It should be understood, however, that exposure times for the PDC-gelatin holographic system may be shortened by the use of higher intensities.

Figure 8:
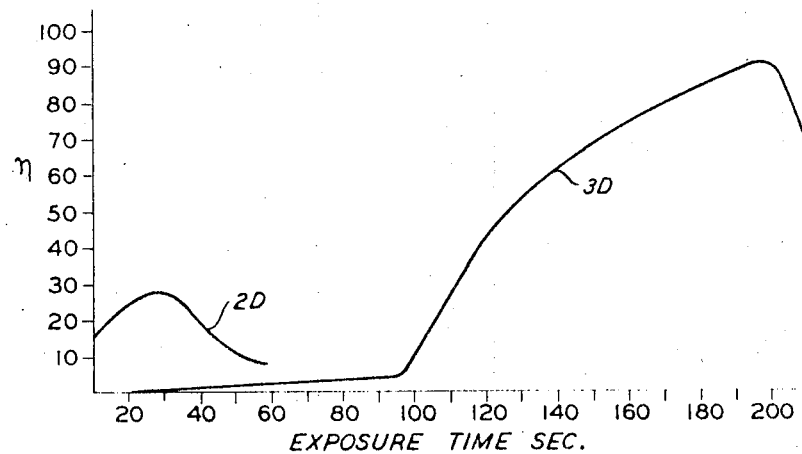
FIG. 8 is a graph of efficiency $\eta$ versus exposure time (seconds)
Figure 9:
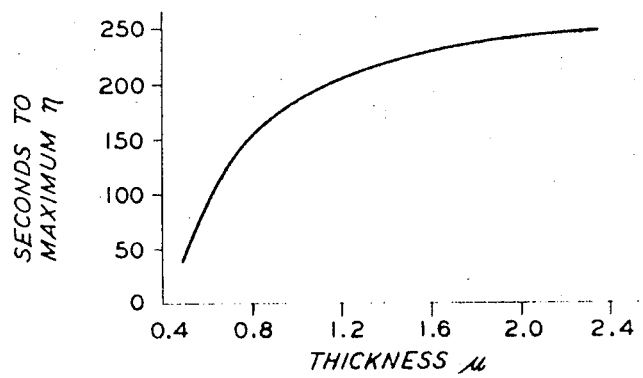
FIG. 9 is a graph of exposure time to achieve maximum $\eta$ (seconds) versus film thickness ($\mu$).

The general shapes of both the 2D and 3D curves in FIG. 8 are explained by the fact that, at the intensities used, appreciable time was required for the absorption of sufficient energy to fully insolubilize the gelatin where desired; but that further exposure permitted the effects of stray light on "unexposed" gelatin to become appreciable and rob the developed pattern of much of its contrast between its exposed and unexposed portions. The break in the 3D curve at about 100 seconds is attributed to noise resulting from etching the wholly underexposed film.

The invention has been described with reference to particular embodiments thereof, but it is intended that variations therefrom which basically rely on the teachings of the invention are to be considered within the scope of the description and the appended claims.

I claim:

1. A method of holographically recording an interference pattern comprising the steps of exposing a film of a composition consisting essentially of gelatin, water and a sensitizer, said sensitizer being selected from the group consisting of chromate and dichromate sensitizers, to interfering source and reference beams, thereby insolubilizing the film in the exposed areas; contacting the exposed film with water to dissolve away the still-soluble portions; then contacting the film with a water absorbable volatile solvent and drying the film by allowing the solvent and water to evaporate.

2. The method of claim 1 wherein the sensitizer is selected from the group consisting of pyridine-dichromate and pyridine-chromium trioxide.

3. The method of claim 1 wherein at least one of the source and reference beams is modulated.

4. A method for holographically producing a low-absorption, high efficiency, high resolution phase diffraction grating in accordance with the method of claim 1 wherein the source and reference beams are essentially unmodulated.

5. A method in accordance with the method of claim 4 wherein the weight ratio of sensitizer to gelatin is from 0.1 to 0.6 and gelatin is present in an amount from a weight ratio to water of 0.02 to its solubility limit; exposure is at an intensity and for a time sufficient to achieve maximum grating efficiency; and the water for dissolving away the still-soluble portions is at a temperature from 15 to 40° C., and is contacted with the film for a time up to two minutes.

6. A low-absorption, high efficiency, high resolution phase diffraction grating comprising a substrate having an interference pattern thereon of a composition comprising insolubilized gelatin.

7. The phase diffraction grating of claim 6 wherein the grating efficiency is approximately 100 percent that of theoretical maximum, the pattern has a periodicity of up to approximately 100,000 lines per inch and a spectral resolving power of at least 0.1 A.

References Cited

UNITED STATES PATENTS 3,484,154  12/1969  Swing, et al.

OTHER REFERENCES

G. Rogers, "Pictures by Waves," "Perspective," 8(4), 1966, pp. 261–275.

H. M. Cartwright, Ilford Graphic Arts Manual, Ilford Ltd., Essex, 1961. pp. 383–87.

Alan Horder, Ilford Manual of Photography, 5th ed., Ilford Ltd., Ilford, Essex; May 1958, pp. 451–52.

NORMAN G. TORCHIN, Primary Examiner

J. E. CALLAGHAN, Assistant Examiner

U.S. Cl. X.R.

96—36, 38.3